United States Patent
Davis

(10) Patent No.: US 7,849,985 B2
(45) Date of Patent: Dec. 14, 2010

(54) PILOT PLATE TORQUE TRANSMITTING ASSEMBLY FOR A TORQUE CONVERTER

(75) Inventor: Michael C. Davis, Sterling, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 542 days.

(21) Appl. No.: 11/804,285

(22) Filed: May 17, 2007

(65) Prior Publication Data

US 2007/0284206 A1    Dec. 13, 2007

Related U.S. Application Data

(60) Provisional application No. 60/811,598, filed on Jun. 7, 2006.

(51) Int. Cl.
*F16H 45/02* (2006.01)

(52) U.S. Cl. .................................. 192/3.29; 192/70.18

(58) Field of Classification Search .................. None
See application file for complete search history.

(56) References Cited

U.S. PATENT DOCUMENTS

| 4,926,988 | A | * | 5/1990 | Kundermann | 192/3.3 |
|---|---|---|---|---|---|
| 5,667,043 | A | | 9/1997 | Dehrmann et al. | |
| 6,264,018 | B1 | | 7/2001 | Matsuoka et al. | |
| 6,390,263 | B1 | | 5/2002 | Arhab | |
| 6,640,945 | B2 | * | 11/2003 | Arhab et al. | 192/3.29 |
| 7,093,701 | B2 | * | 8/2006 | Zuehl et al. | 192/3.29 |
| 7,267,212 | B2 | * | 9/2007 | Wack et al. | 192/3.29 |
| 2001/0011621 | A1 | * | 8/2001 | Bauer et al. | 192/3.29 |

FOREIGN PATENT DOCUMENTS

| DE | 3823210 | 1/1990 |
|---|---|---|
| DE | 10311357 | 10/2003 |
| DE | 19680459 | 5/2006 |

\* cited by examiner

*Primary Examiner*—Richard M. Lorence
(74) *Attorney, Agent, or Firm*—Simpson & Simpson, PLLC

(57) ABSTRACT

A pilot plate torque transmitting assembly for a torque converter, including: a pilot plate arranged to be rotationally connected to a housing for the torque converter; a piston plate for a clutch; and at least one spring assembly rotationally connecting the pilot plate and the piston plate. The at least one spring assembly is arranged to be axially disposed between the piston plate and the housing for the torque converter. In some aspects, the piston plate is arranged to form at least a portion of a pressure release chamber for the clutch with the housing, and the assembly includes a channel between the piston plate and the pilot plate and arranged to be in fluid communication with the release chamber. In some aspects, the pilot plate or the piston plate is stamped.

17 Claims, 12 Drawing Sheets

PRIOR ART

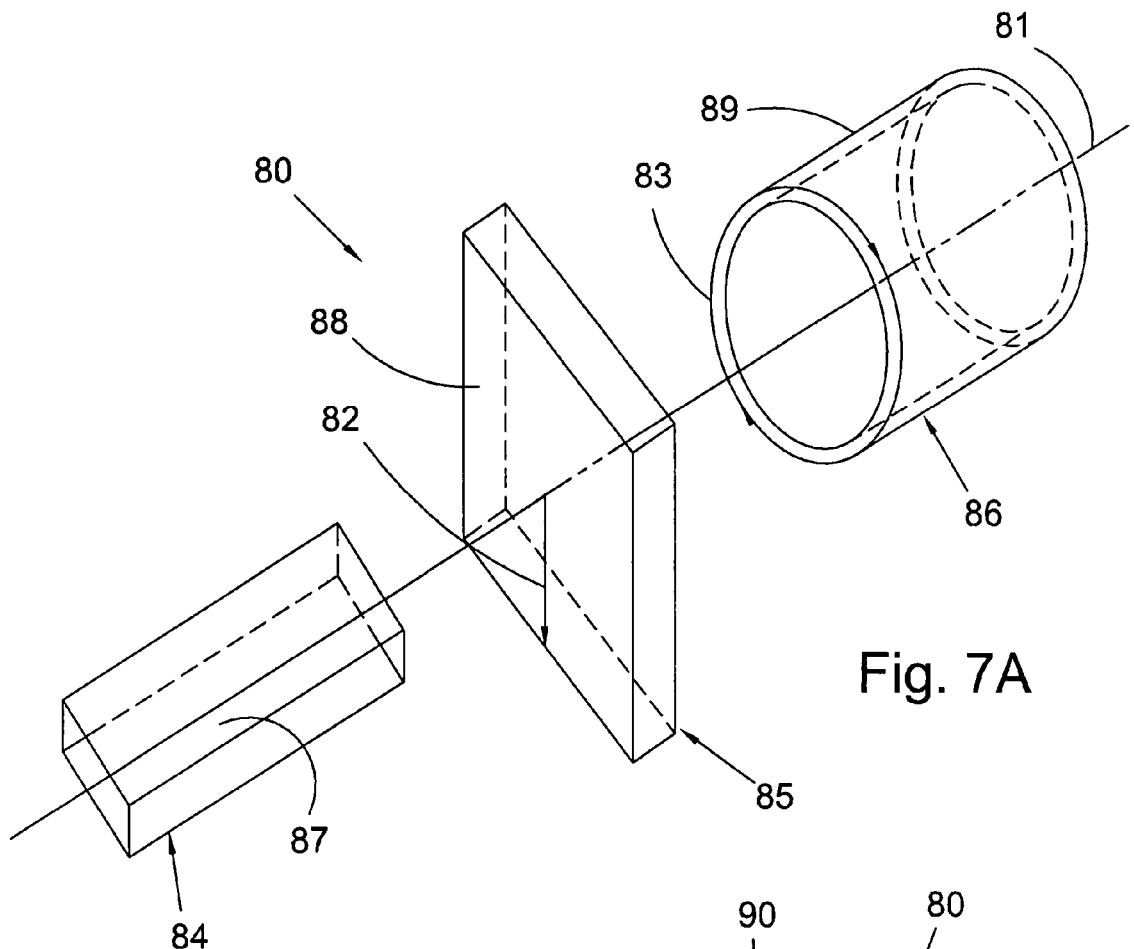
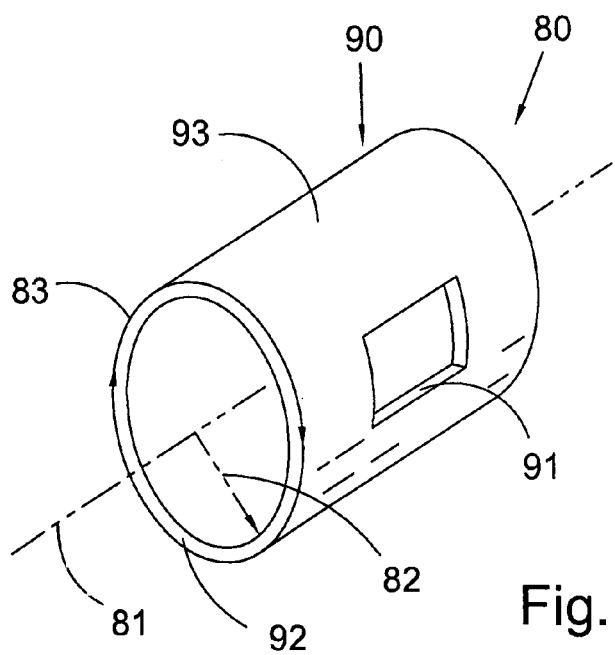

PILOT PLATE TORQUE TRANSMITTING ASSEMBLY FOR A TORQUE CONVERTER

CROSS-REFERENCE TO RELATED APPLICATIONS

This application claims the benefit under 35 U.S.C.§119(e) of U.S. Provisional Application No. 60/811,598 filed Jun. 7, 2006

FIELD OF THE INVENTION

The invention relates generally to piston plate connection for a torque converter, and, more particularly, to a pilot plate that transmits torque to a clutch piston plate and provides a fluid circuit channel in conjunction with the piston plate. The assembly enables an increase in the radial extent of the piston plate.

BACKGROUND OF THE INVENTION

It is well known that a torque converter is used to transmit torque from an engine to a transmission of a motor vehicle. FIG. 1 illustrates a general block diagram showing the relationship of the engine 7, torque converter 10, transmission 8, and differential/axle assembly 9 in a typical vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10, a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At high speed ratios, the torque converter is less efficient. The torque ratio of the torque converter gradually reduces from a high of about 1.8 to 2.2, to a torque ratio of about 1 as the turbine rotational speed approaches the pump rotational speed. Torque ratio of 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Maximum torque converter efficiency is limited to 92-93% based on losses in the fluid. Therefore torque converter clutch 49 is employed to mechanically connect the torque converter input to the output, improving efficiency to near 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Torque capacity of a clutch can be increased by increasing the surface area of the friction material for the clutch, increasing apply pressure, or by positioning the friction surfaces of a clutch as far radially from the axis of the torque converter as possible. Current design of multi-plate torque converter clutches feature a driven plate member located radially outside of the clutch plates, for example, U.S. Pat. No. 6,264,018 (Matsuoka et al.). The attachment can be carried out with leaf springs which are flexible enough to allow axial displacement of the piston plate. Unfortunately, placing the driven plate outside the clutch plates reduces the radial space available for the clutch plates, which in turn, reduces the torque capacity of the clutch plates. Also, increasing apply pressure can increase the cost and complexity of fluid circuit elements and increasing clutch surface area may reduce space needed for other components in the torque converter.

In torque converter design, it is known to engage the engine side of a hub with a pilot element for the converter. Typically, a thrust washer is placed between the hub and the pilot element. Unfortunately, the interface of the hub and pilot element restricts or eliminates fluid circuits in the torque converter, which can affect operation of the torque converter, for example, operation of piston plates for clutches. It is known to modify components to create fluid paths. For example, U.S. Pat. No. 5,667,043 (Dehrman et al.), teaches a forged piloting element that has drilled holes to act as channels for venting and discharging a fluid chamber. Unfortunately, forged components themselves are relatively expensive and the extra drilling steps further increase the cost and complexity of the parts, for example, the forged piloting element.

Thus, there is a long-felt need to provide a torque converter clutch with increased torque capacity. Specifically, what is needed is a means to increase the radial extent of the clutch. There also is a need to improve the fluid circuitry associated with a pilot plate and hub interface in a cost-effective manner.

SUMMARY OF THE INVENTION

The invention broadly comprises a pilot plate torque transmitting assembly for a torque converter, including: a pilot plate arranged to be rotationally connected to a housing for the torque converter; a piston plate for a clutch; and at least one spring assembly rotationally connecting the pilot plate and the piston plate. The at least one spring assembly is arranged to be axially disposed between the piston plate and the housing for the torque converter. The at least one spring assembly includes a first end connected to the pilot plate and a second end connected to the piston plate. In some aspects, the pilot plate includes at least one tab disposed proximate an outer circumference of the pilot plate and the first end is connected to the tab. In some aspects, at least one of the pilot plate and piston plate is connected to the at least one spring with at least one rivet or the at least one rivet is extruded from the at least one of the pilot plate and piston plate. The piston plate is arranged to form at least a portion of a pressure release chamber for the clutch with the housing, and the assembly includes a channel between the piston plate and the pilot plate and arranged to be in fluid communication with the release chamber. In some aspects, the pilot plate is stamped, the piston plate is stamped, the at least one spring assembly further comprises at least one leaf spring, or the clutch further comprises a twin plate clutch.

The invention also broadly comprises a pilot plate torque transmitting assembly for a torque converter, including: a pilot plate arranged to be rotationally connected to a cover for the torque converter; a piston plate for a clutch; at least one spring assembly rotationally connecting the pilot plate and the piston plate; and at least one channel disposed between the pilot plate and the piston plate. The piston plate is arranged to form at least a portion of a chamber disposed between the cover and the piston plate and the at least one channel is arranged to be in fluid communication with the chamber. In some aspects, the at least one spring assembly is arranged to be axially disposed between the cover and the piston plate, or at least one of the pilot plate or the piston plate is stamped.

The invention further broadly comprises a pilot plate torque transmitting assembly for a torque converter, including: a pilot plate arranged to be rotationally connected to a housing for the torque converter and arranged to engage a crankshaft; a piston plate for a clutch; and at least one spring assembly directly connected to the pilot plate and the piston plate. The at least one spring assembly rotationally connects the pilot plate and the piston plate. In some aspects, the at least one spring assembly is arranged to be axially disposed between the housing and the piston plate. In some aspects, the piston plate is arranged to form at least a portion of a pressure release chamber for the clutch with the housing and the assembly includes a channel between the piston plate and the pilot plate and arranged to be in fluid communication with the release chamber. In some aspects, at least one of the pilot plate or the piston plate is stamped.

The invention broadly comprises a pilot plate torque transmitting assembly for a torque converter, including: a stamped pilot plate arranged to be rotationally connected to a cover for the torque converter; a stamped piston plate for a clutch; at least one spring assembly rotationally connecting the pilot plate and the piston plate; and a channel disposed between the pilot plate and the piston plate. The at least one spring assembly is arranged to be axially disposed between the piston plate and the cover, the piston plate is arranged to form at least a portion of a pressure release chamber for the clutch with the cover, and the channel is arranged to be in fluid communication with the release chamber.

It is a general object of the present invention to provide a pilot plate torque transmitting assembly for a torque converter without the use of forged components.

It is another general object of the present invention to provide a pilot plate torque transmitting assembly for a torque converter using stamped components to the extent possible.

These and other objects and advantages of the present invention will be readily appreciable from the following description of preferred embodiments of the invention and from the accompanying drawings and claims.

BRIEF DESCRIPTION OF THE DRAWINGS

FIG. 7A is a perspective view of a cylindrical coordinate system demonstrating spatial terminology used in the present application;

FIG. 7B is a perspective view of an object in the cylindrical coordinate system of FIG. 7A demonstrating spatial terminology used in the present application;

DETAILED DESCRIPTION OF THE PREFERRED EMBODIMENT

Figure 1:
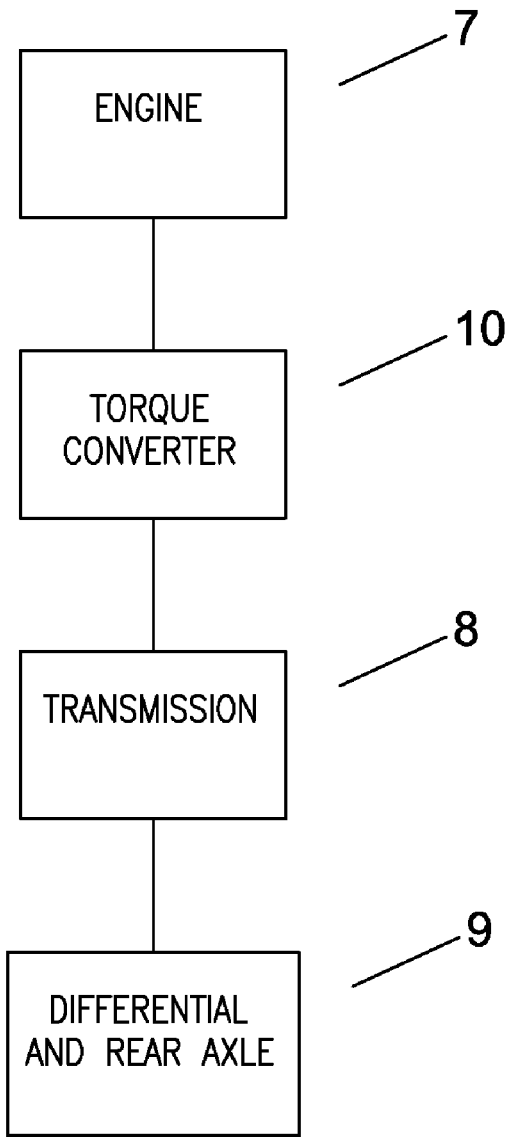
FIG. 1 is a general block diagram illustration of power flow in a motor vehicle, intended to help explain the relationship and function of a torque converter in the drive train thereof.
Figure 2:
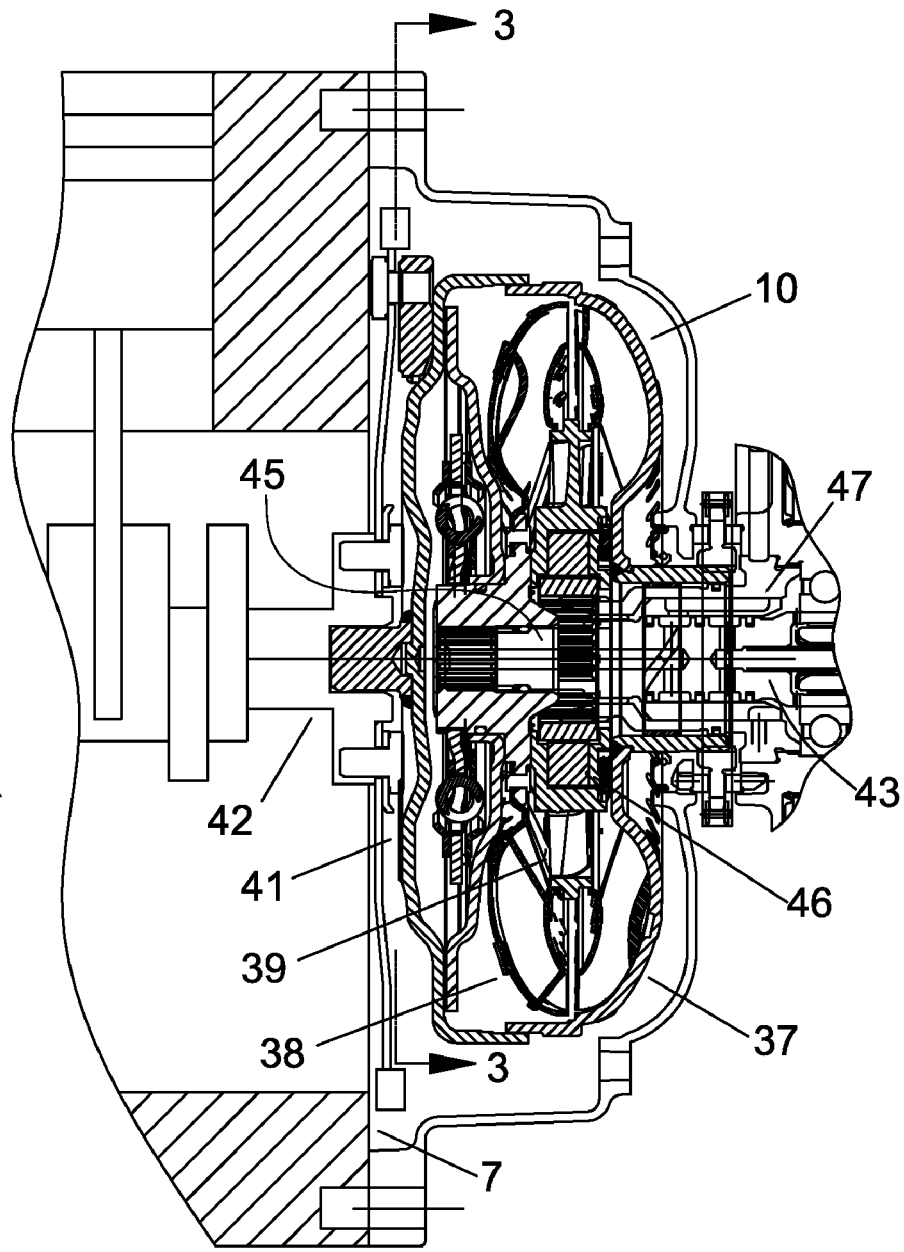
FIG. 2 is a cross-sectional view of a prior art torque converter, shown secured to an engine of a motor vehicle.
Figure 3:
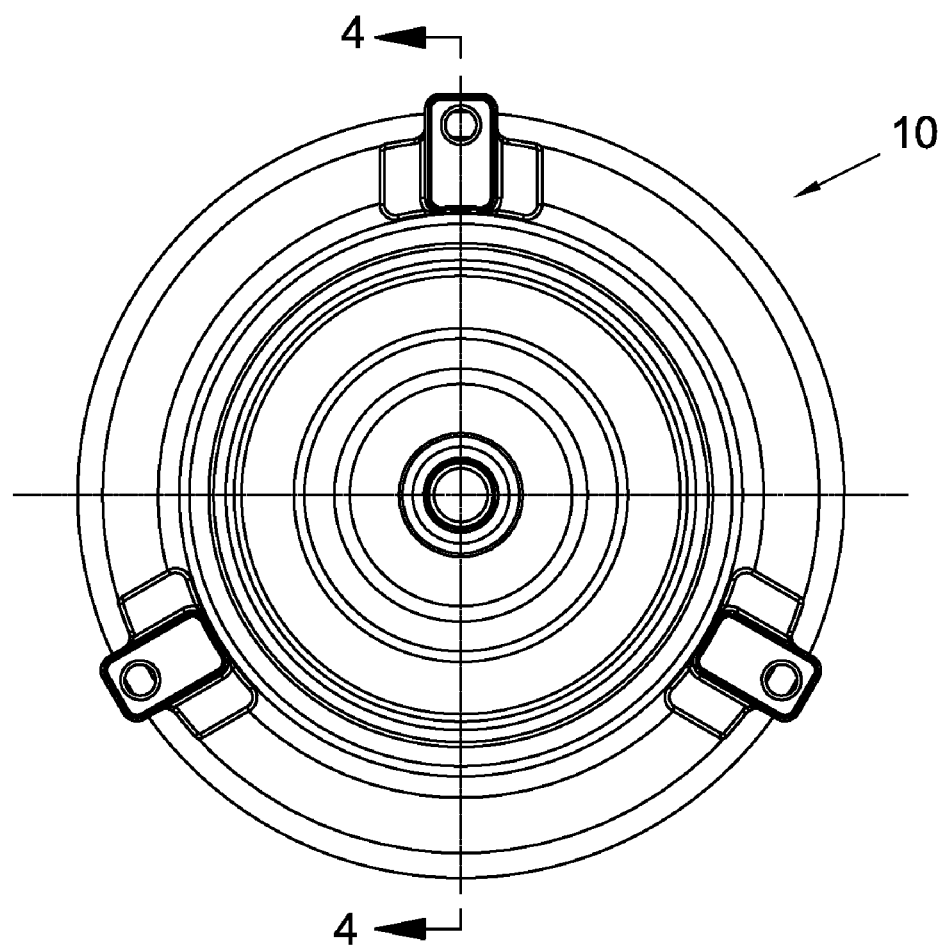
FIG. 3 is a left view of the torque converter shown in FIG. 2, taken generally along line 3-3 in FIG. 2.
Figure 4:
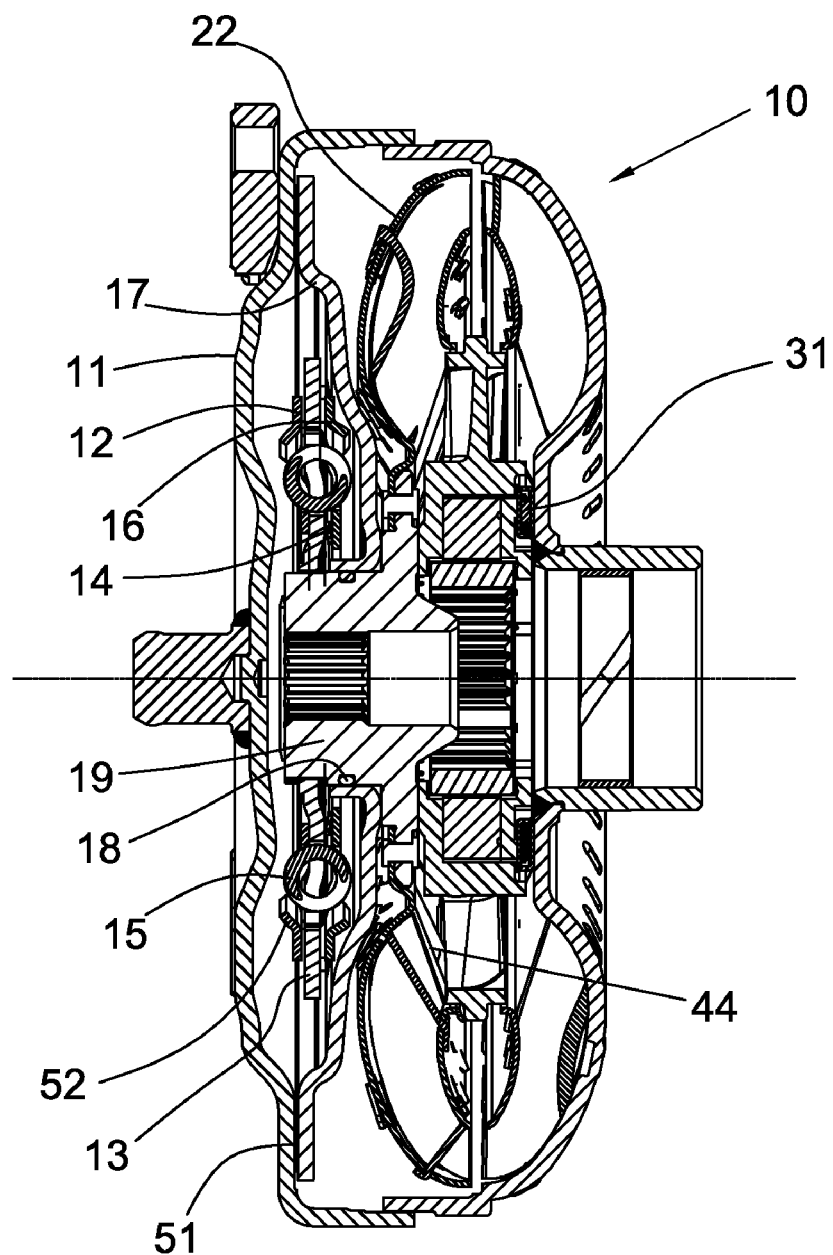
FIG. 4 is a cross-sectional view of the torque converter shown in FIGS. 2 and 3, taken generally along line 4-4 in FIG. 3.
Figure 5:
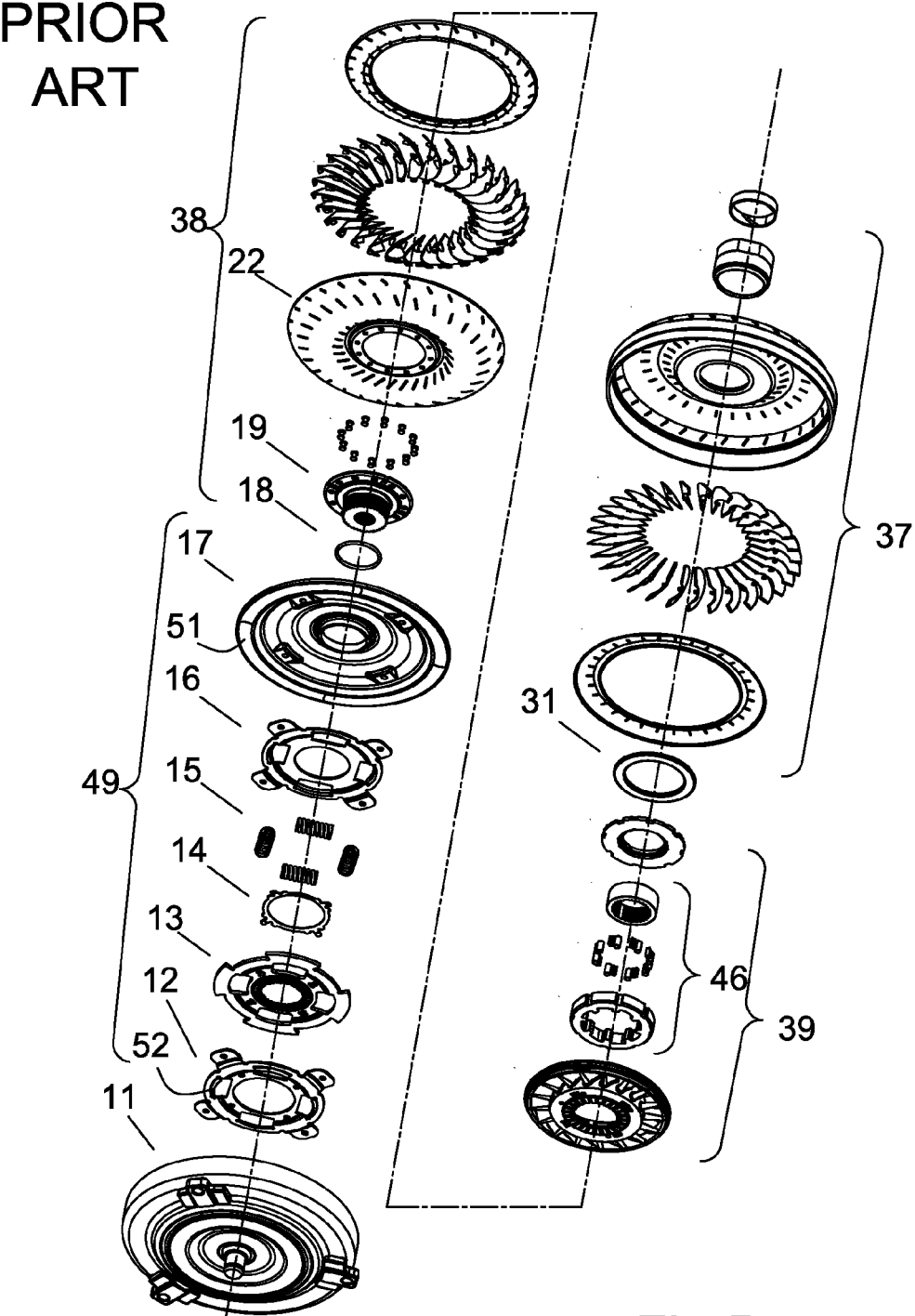
FIG. 5 is a first exploded view of the torque converter shown in FIG. 2, as shown from the perspective of one viewing the exploded torque converter from the left.
Figure 6:
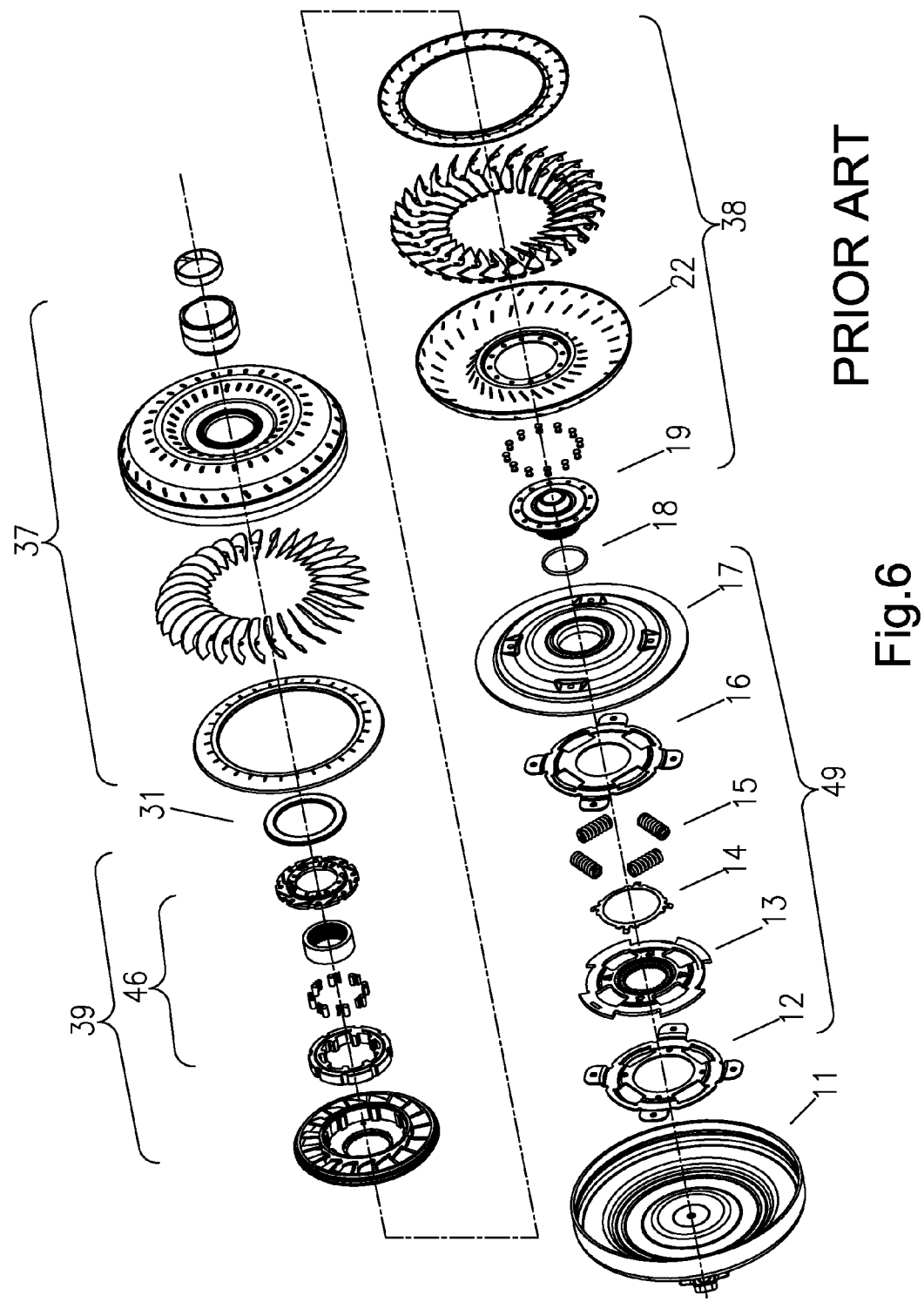
FIG. 6 is a second exploded view of the torque converter shown in FIG. 2, as shown from the perspective of one viewing the exploded torque converter from the right.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

By rotationally connected, or secured, we mean that the gear and the shell are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), or circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are with respect to orientation parallel to respective planes.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
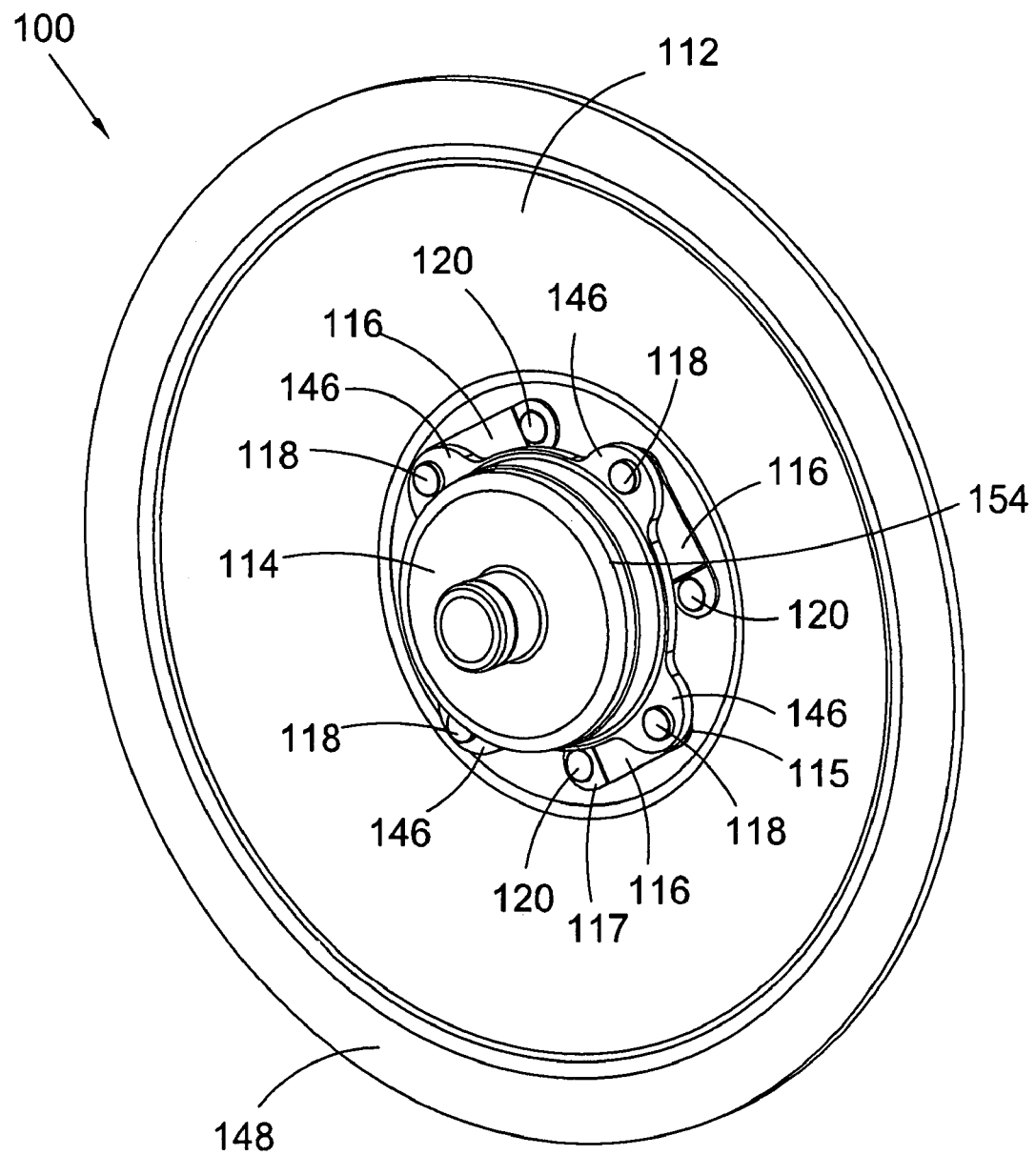
FIG. 8 is a front perspective view of a present invention pilot plate torque transmitting assembly for a torque converter.

FIG. 8 is perspective view of present invention pilot plate torque transmitting assembly 100 for a torque converter.

Figure 9:
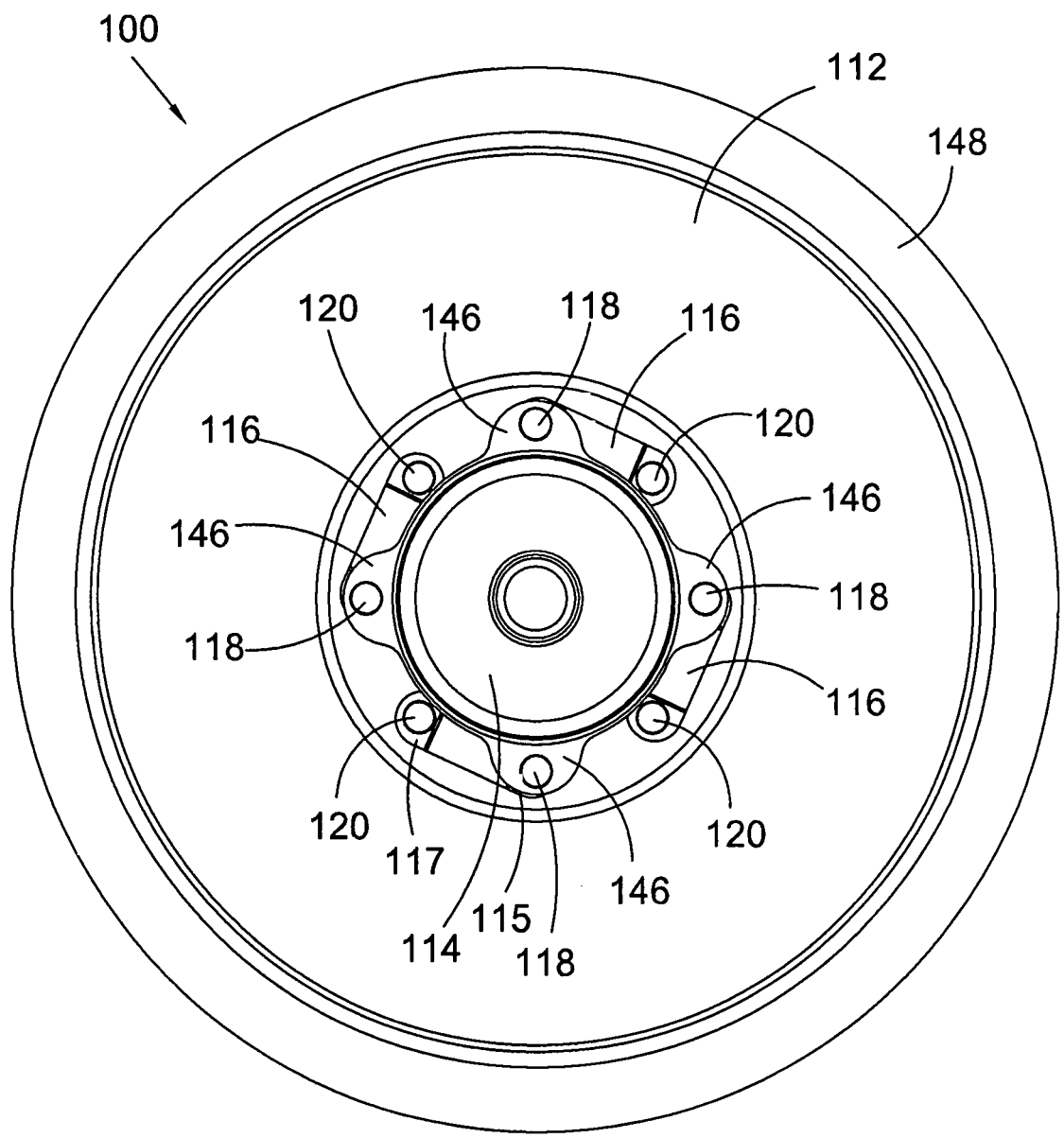
FIG. 9 is a front view of the assembly shown in FIG. 8.

FIG. 9 is a front view of assembly 100 shown in FIG. 8.

Figure 10:
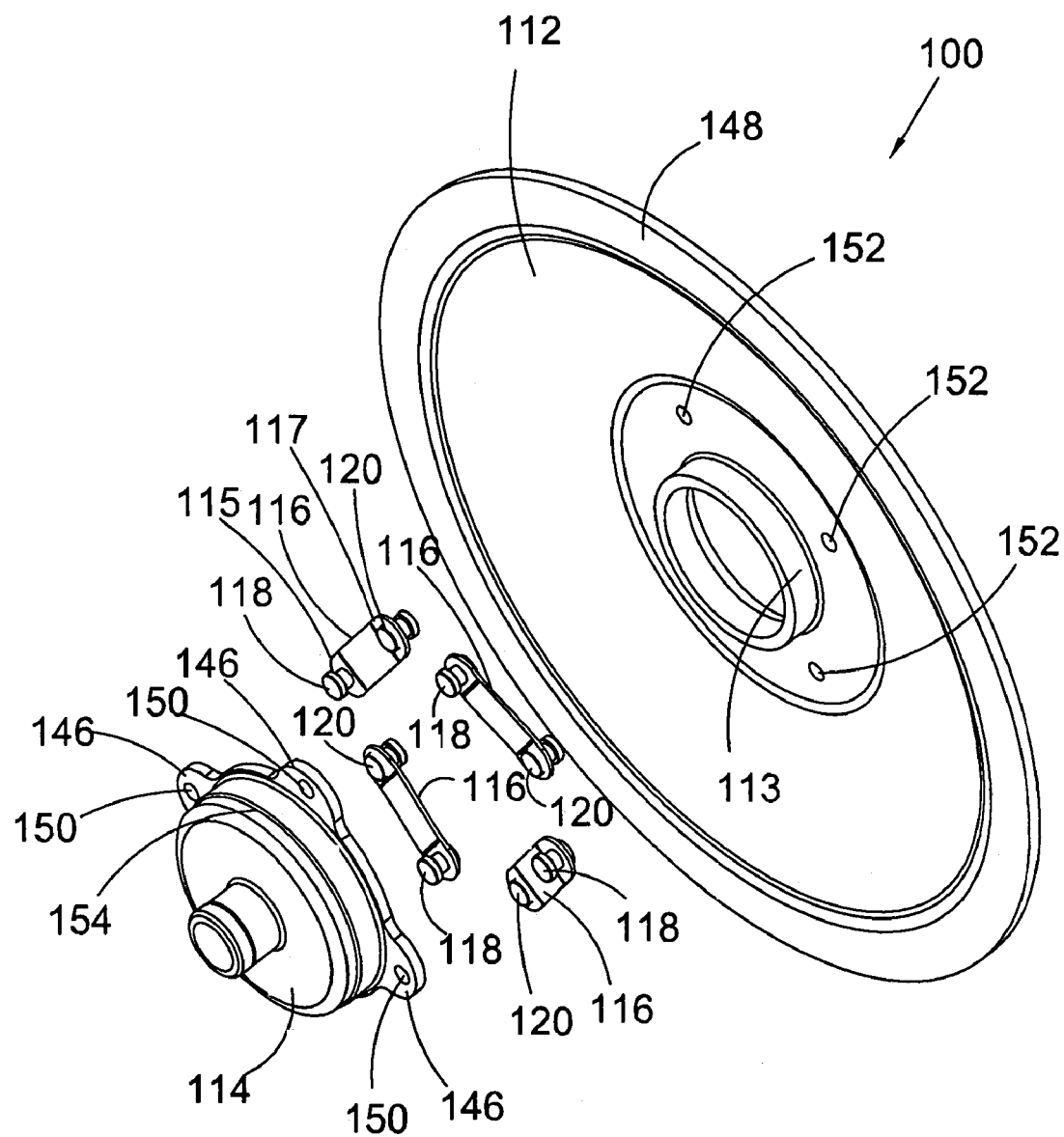
FIG. 10 is a perspective exploded view of the assembly shown in FIG. 8.

FIG. 10 is a front exploded view of assembly 100 shown in FIG. 8.

Figure 11:
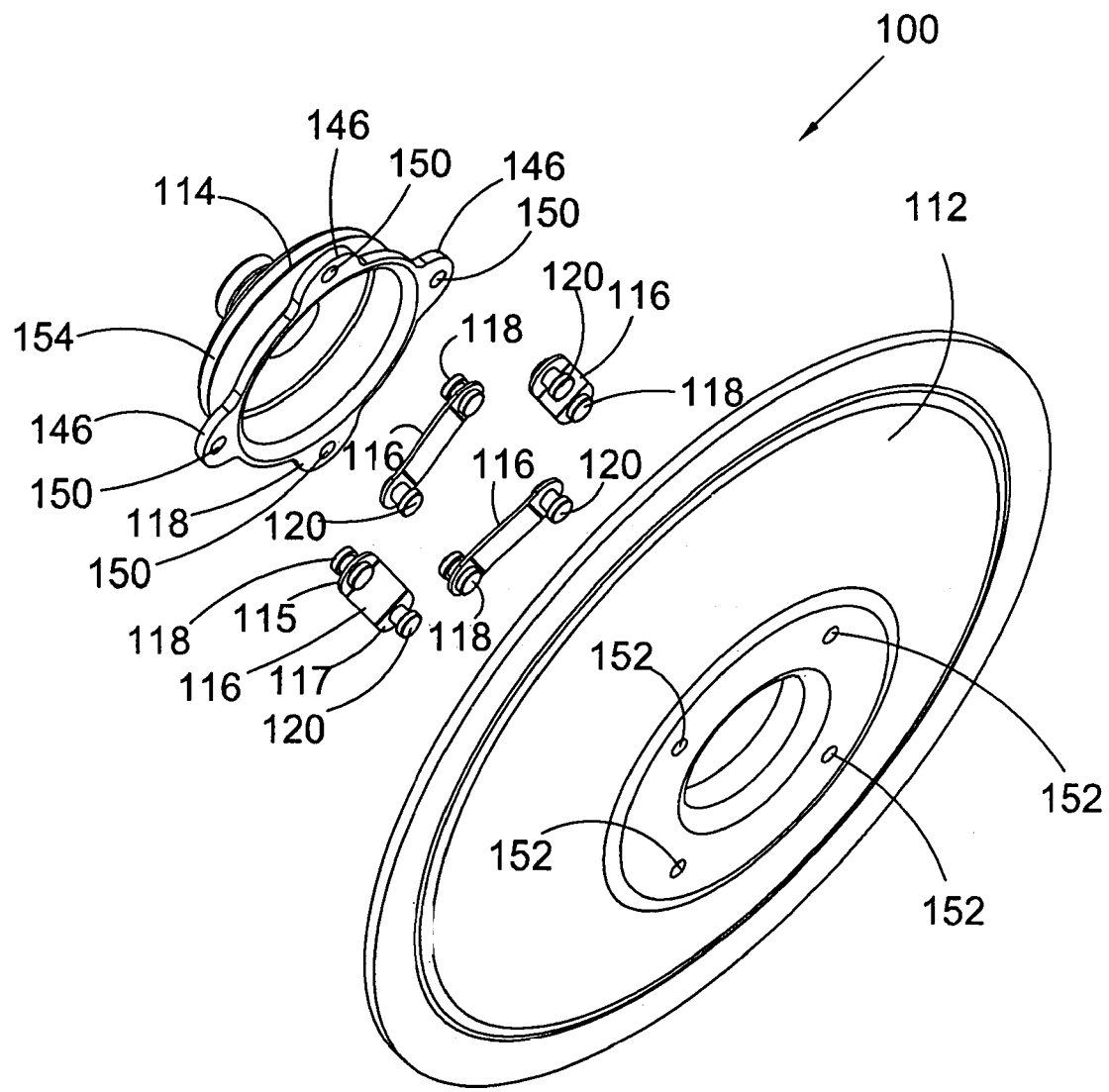
FIG. 11 is a rear exploded view of the assembly shown in FIG. 8.
Figures 12, 13:
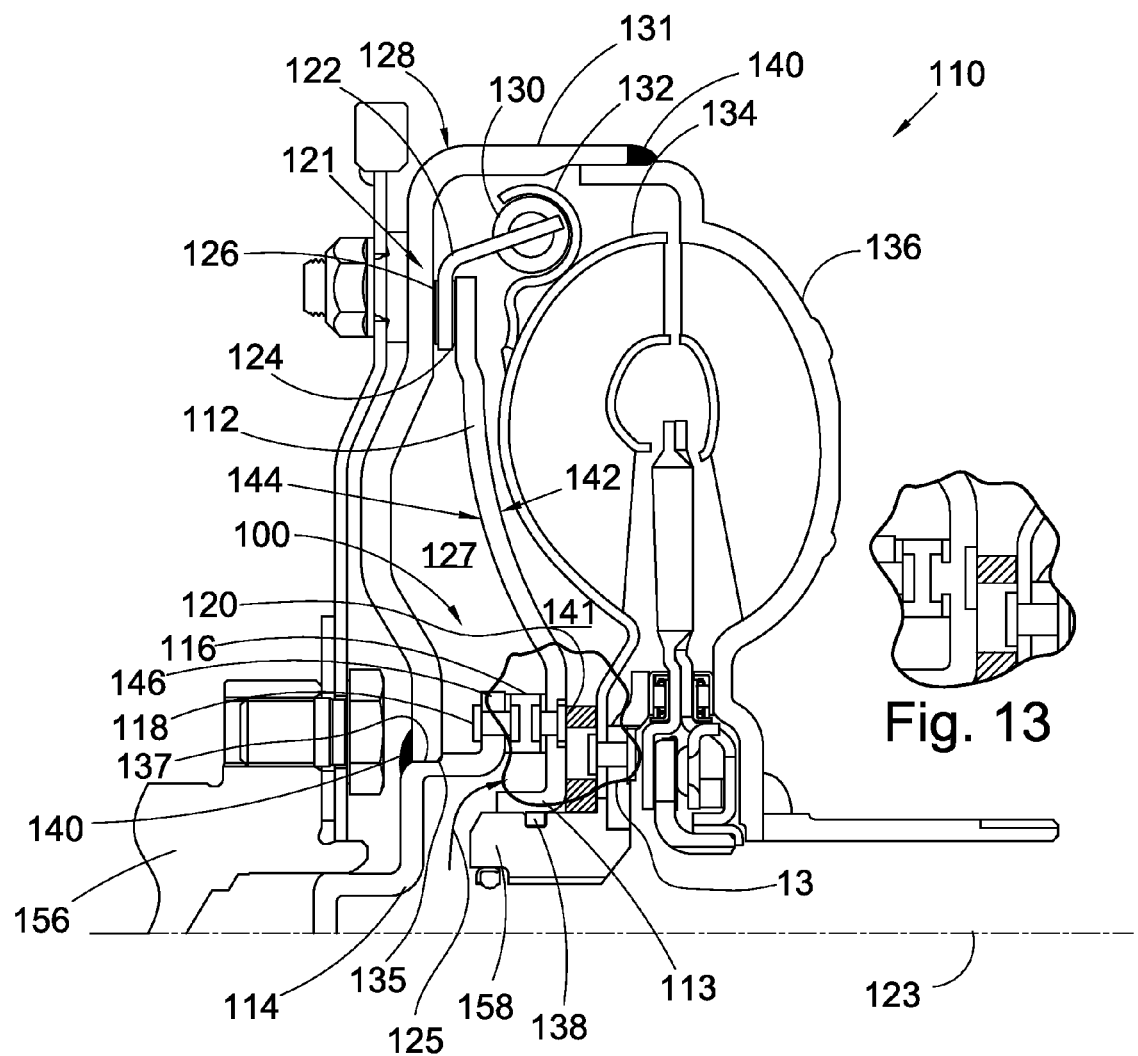
FIG. 12 is a partial cross-sectional view of a present invention clutch drive assembly in a torque converter; and, FIG. 13 is a cross-sectional view of area 13 in FIG. 12, showing an extruded rivet.

FIG. 11 is a rear exploded view of assembly 100 shown in FIG. 8. The following should be viewed in light of FIGS. 8 through 11. Assembly 100 includes piston plate 112, pilot plate 114, and spring assemblies, or spring elements, 116. Hereinafter, the terms "spring assembly" and "spring element" are used interchangeably. Each end of the spring assemblies is connected to plate 112 and pilot plate 114, respectively. The spring assemblies rotationally connect the two plates. For example, end 115 is connected to plate 114, and end 117 is connected to plate 112. The spring assemblies can be attached by any means known in the art, for example, including but not limited to, welding or bolts. In some aspects, rivets 118 and 120 are used to attach the springs. Holes 150 and 152 in plate 114 and 112, respectively, receive rivets 118 and 120, respectively. Rivets 118 and 120 are shown preened or upset, and removed from holes 150 and 152, respectively. In some aspects, rivets 118 and 120 are stand alone rivets. In some aspects, for example, as shown in FIG. 13, the rivets are extruded from piston plate 112 or pilot plate 114. In some aspects, spring assemblies 116 are springs. Any applicable spring known in the art can be used for springs 116. In some aspects, the springs are leaf springs.

In some aspects, plate 114 includes tabs 146 for holes 150. In some aspects, the tabs are evenly spaced about outer circumference 154 of pilot plate 114. However, it should be understood that other spatial configurations are possible. The placement of tabs 146 on outer circumference 154 allows the offset attachment of piston plate 112 to pilot plate 114, which provides access to the rear side of rivet 118 to allow for proper upsetting of the rivet. In some aspects, (not shown) plate 114 has a uniform circumference that is used for attachment to plate 112. For example, rivet holes can be placed on a uniform circumference.

FIG. 12 is a partial cross-sectional view of present invention clutch drive assembly 100 in torque converter 110. In some aspects, a present assembly 100 is connected to a clutch in a torque converter, for example, torque converter 110. Pilot plate 114 is rotationally connected to cover 128 by any means known in the art. In some aspects, the plate is fixedly connected to the cover by weld 140. Pilot plate 114 is rotationally connected to piston plate 112 as described supra. Thus, engine torque is transmitted from the cover to plate 112 via the pilot plate.

Advantageously, a present invention arrangement creates torque paths that enable damper 130 to be disposed radially further out than in the arrangement shown supra, while still enabling lock-up clutch 121 to include a relatively large diameter. Specifically, the pilot plate is connected to cover 128, which receives torque from crankshaft 156, and to plate 112 proximate neck 113 near the inner circumference of piston plate 112. Thus, torque is transmitted through the cover to plate 114 and spring assemblies 116 to a point near an inner radial circumference of plate 112. Drive plate 122 is disposed in clutch 121 to provide a connection from the clutch to damper springs 130, enabling spring retainer 132 to be fixed to turbine shell 134 near the outer circumference of housing 128. That is, the drive plate is not radially hemmed in by the connection of piston 112 to the housing. During lock-up mode then, torque is transmitted to the clutch through contact with the cover, for example, through friction material 126, and through the connection of plate 112 with plate 114. Since damper torque is the product of spring rate (strength), spring compression, and radial distance, increasing the radial distance of the damper by disposing the damper near outer circumference 131 enables the use of springs 130 having a lesser rate. Advantageously, lowering the spring rate for springs 130 increases the ability of the damper to provide isolation. Also, positioning the damper near the outer circumference of the housing, instead of radially closer to axis 123 takes advantage of space 133 not normally used in a torque converter, freeing valuable axial space radially closer to axis 123, for example, space in chamber 127.

Seal 138 on turbine hub 158 contacts neck 113 of piston plate 112 to seal the inner circumference of pressure chamber 141. Friction materials 124 and 126 operate to seal high pressure chamber 141 at the outer circumference of pressure chamber 141. Pressure chamber 141 exerts pressure against apply side 142 to cause axial displacement of piston plate 112.

The proper operation of clutch 121 requires a rapid displacement of fluid in and out of chambers 127 and 141. The design of pilot plate 114 results in fluid channel 125 to chamber 127 between the pilot plate and hub 158. Springs 116 are intermittently located about circumference 154 and hold the pilot plate and plate 112 axially apart while leaving circumferential spaces between the assemblies. Therefore, channel 125 provides a means of displacing fluid in and out of chamber 127.

Pilot plate 114 centers, or pilots, torque converter 110 with respect to crankshaft 156. Pilot plate 114 is a separate piece, attached to cover 128, which offers a number of advantages. Pilot plates stamped from the same piece as the cover increase the number of stamping steps, or stations in the stamping press, required to form the cover. In some cases, the extra steps may require running the cover through a press a second time due to the limited number of stations available in the press, complicating stamping operations and increasing the cost of producing the cover. Advantageously, forming the pilot plate separately eliminates the extra stamping steps for the cover. Further, pilot plate 114 is a smaller diameter piece, which means more stations can be incorporated in a given press used to form the pilot plate. Also, less force is needed to stamp the smaller pilot plate, therefore, a less powerful (and costly) press can be used to form the pilot plate. In addition, a separate pilot plate and cover enables the fabrication of the tabs or flange used on the pilot plate to connect springs 116 to the pilot plate.

The lift-off for piston plate 112, that is, the distance between plate 112 and cover 128 can be established by the connection of pilot plate 114 to cover 128. In some aspects, the lift-off is established by shoulder 135 on the pilot plate, which established the axial position of the cover with respect to the pilot plate. In some aspects (not shown), there is no shoulder on the pilot plate, the cover, drive plate 122, and piston 112 are axially stacked together, and the axial position of the cover on circumferential surface 137 of the piston plate is adjusted to give the desired lift-off. Then, the cover is secured to the pilot plate, for example, by welding.

In some aspects, plate 112 and pilot plate 114 are formed by stamping.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A pilot plate torque transmitting assembly for a torque converter, comprising:
   a cover for the torque converter including an interior surface facing a first direction and an exterior surface facing a second direction opposite the first direction;
   a pilot plate including first and second portions, the pilot plate directly connected to the cover such that the cover and pilot plate rotate in unison;
   a piston plate for a clutch; and,
   at least one spring element rotationally connecting said pilot plate and said piston plate, wherein said at least one spring element is arranged to be axially disposed between said piston plate and the cover for said torque converter, wherein the first portion of the pilot plate extends in a first axial direction away from the interior surface of the cover and toward the piston plate, and wherein the second portion of the pilot plate extends away from the exterior surface in a second axial direction, opposite the first axial direction.

2. The assembly of claim 1, wherein said at least one spring element further comprises a first end connected to said pilot plate and a second end connected to said piston plate.

3. The assembly of claim 1, wherein said pilot plate further comprises at least one tab disposed proximate an outer circumference of said pilot plate and wherein said first end is connected to said tab.

4. The assembly of claim 1, wherein at least one of said pilot plate and piston plate is connected to said at least one spring element with at least one rivet.

5. The assembly of claim 4, wherein said at least one rivet is extruded from at least one of said pilot plate and piston plate.

6. The assembly of claim 1, wherein said piston plate is arranged to form at least a portion of a pressure release chamber for said clutch with said cover; and, said assembly further comprising a channel between said piston plate and said pilot plate and arranged to be in fluid communication with said release chamber.

7. The assembly of claim 1, wherein said pilot plate is stamped.

8. The assembly of claim 1, wherein said piston plate is stamped.

9. The assembly of claim 1, wherein said at least one spring element further comprises at least one leaf spring.

10. The assembly of claim 1, wherein said clutch further comprises a twin plate clutch.

11. A pilot plate torque transmitting assembly for a torque converter, comprising:
    a cover for the torque converter including an outer circumferential edge connected to an impeller shell for the torque converter and an inner circumferential edge located radially inward of the outer circumferential edge;
    a pilot plate fixedly secured to the inner circumferential edge of the cover;
    a piston plate for a clutch;
    at least one spring element rotationally connecting said pilot plate and said piston plate;
    a turbine hub; and,
    at least one channel with a first portion formed by said pilot plate and said piston plate, wherein said piston plate is arranged to form at least a portion of a chamber disposed between said housing and said piston plate, wherein a first portion of the chamber is formed solely by the piston plate and the cover, wherein said at least one channel opens directly into said chamber, wherein the at least one channel passes around and not through the pilot plate, wherein a second portion of the at least one channel is formed by the turbine hub and the pilot plate, and wherein an opening at one end of the at least one channel is formed by the turbine hub and the pilot plate.

12. The assembly of claim 11 wherein said at least one spring element is arranged to be axially disposed between said cover and said piston plate.

13. The assembly of claim 11, wherein at least one of said pilot plate and said piston plate is stamped.

14. A pilot plate torque transmitting assembly for a torque converter, comprising:
    a pilot plate arranged to be rotationally connected to a cover for the torque converter and arranged to contact a crankshaft;
    a piston plate for a clutch; and,
    at least one spring element directly connected to said pilot plate and said piston plate, said at least one spring element rotationally connecting said pilot plate and said piston plate.

15. The assembly of claim 14 wherein said at least one spring element is arranged to be axially disposed between said cover and said piston plate.

16. The assembly of claim 14 wherein said piston plate is arranged to form at least a portion of a pressure release chamber for said clutch with said cover; and, said assembly further comprising a channel between said piston plate and said pilot plate and arranged to be in fluid communication with said release chamber.

17. The assembly of claim 14, wherein at least one of said pilot plate and said piston plate is stamped.

* * * * *